United States Patent [19]

Grant

[11] 4,250,764
[45] Feb. 17, 1981

[54] NON-METALLIC SPROCKET CHAIN HAVING QUICK DETACHABLE, TWIST-LOCKING PIVOT PINS

[76] Inventor: Glenn G. Grant, P.O. Box 12321, Columbus, Ohio 43212

[21] Appl. No.: 22,954

[22] Filed: Mar. 23, 1979

[51] Int. Cl.³ .............................................. F16G 13/02
[52] U.S. Cl. .................... 474/207; 474/227; 474/234
[58] Field of Search ............. 85/5 CP, 5 P; 74/251 R, 74/245 P, 250 R, 254, 245 R, 245 C, 250 C, 251 C, 252; 59/85, 86; 198/850, 851, 853

[56] References Cited

U.S. PATENT DOCUMENTS

| 804,723 | 11/1905 | Horst | 74/251 |
|---|---|---|---|
| 1,338,808 | 5/1920 | Bethke | 74/252 |
| 1,504,646 | 8/1924 | Roddy | 74/251 C |
| 1,560,638 | 11/1925 | Anderson | 74/245 K |
| 1,608,340 | 11/1926 | Scherdy | 74/254 |
| 1,719,673 | 7/1929 | Rottmer | 59/86 |
| 2,124,912 | 7/1938 | Ehmann | 151/34 |
| 2,239,125 | 4/1941 | Summers | 24/221 K |
| 2,259,880 | 10/1941 | Ehmann | 59/86 |
| 2,283,526 | 5/1942 | Albin | 85/5 P |
| 2,412,364 | 12/1946 | Sivyer | 74/250 R |
| 2,420,256 | 5/1947 | MacKenzie | 59/86 |
| 2,810,297 | 10/1957 | Drewry | 74/254 |
| 2,884,677 | 5/1959 | Zahodiakin | 24/221 K |
| 3,127,980 | 4/1964 | Lanham | 74/245 P |
| 3,138,236 | 6/1964 | Goodgame | 74/245 P |
| 3,365,970 | 1/1968 | Steorts, Jr. | 74/250 R X |
| 3,486,205 | 12/1969 | Smith | 24/221 R |
| 4,123,947 | 11/1978 | Smith et al. | 74/245 P |

FOREIGN PATENT DOCUMENTS

| 962486 | 2/1975 | Canada | 74/245 R |
|---|---|---|---|
| 380959 | 9/1932 | United Kingdom | 198/853 |
| 792578 | 4/1958 | United Kingdom | 74/245 P |

Primary Examiner—Leslie Braun
Attorney, Agent, or Firm—William S. Rambo

[57] ABSTRACT

A sprocket chain for use in a normally corrosive environment is made up of identical, clevis-type links of synthetic resin composition pivotally connected by quick detachable, twist-locking pivot pins also of synthetic resin composition. The links are each formed at one end thereof with relatively spaced apart, transversely aligned eyes which may be resiliently flexed inwardly toward one another to permit a locking lug on the pivot pin to move into snap-locking engagement with a notch or dwell formed in a cam-like locking surface on one of the eyes of the link. The pivot pins are quickly removable from the links by simply rotating the pin about 90 degrees in either direction and thereafter withdrawing the pin axially from the eyes of the link.

2 Claims, 6 Drawing Figures

NON-METALLIC SPROCKET CHAIN HAVING QUICK DETACHABLE, TWIST-LOCKING PIVOT PINS

BACKGROUND OF THE INVENTION

This invention relates generally to chain construction, and more particularly to sprocket chains made up of a series of identical links hingedly connected together by pivot pins. More specifically, the present invention deals with an improved sprocket chain composed of interconnecting links and pivot pins of synthetic resin composition and adapted especially for use in normally corrosive environs such a sewage treatment plants, sludge settling tanks and the like.

While the prior art, as typified by U.S. Pat. Nos. 3,127,980 and 3,138,236, teaches chain links formed of corrosion-resistant plastics or synthetic resins and which may be resiliently flexed to facilitate connection and disconnection of one link from another, so far as I am aware, the prior art does not disclose or make obvious a sprocket chain made up of a number of identical links of synthetic resin composition pivotally or hingedly joined by quickly detachable, twist-locking pivot pins also formed from a corrosion-resistant synthetic resin, and wherein the pivot pins are constructed and arranged to cooperate with a cam-type locking surface on each link to provide a resiliently-pressed snap-locking engagement between the pivot pin and chain link.

Also, the prior art discloses numerous different forms and constructions of sprocket chains made up of a plurality of identical metal links pivotally connected by transverse pivot pins. See, for example, U.S. Pat. Nos. 1,608,340; 2,124,912; 2,259,880; 2,420,256 and 2,810,297. However, so far as I am aware, the prior art is devoid of any sprocket chain composed of a plurality of identical, clevis-like links which are pivotally or hingedly connected by twist-locking pivot pins, and wherein the pivot pins are formed with cam-follower lugs or detents engageable with cam-type locking surfaces on the links to initially flex the opposite eyes of the links toward one another and then cause the eyes of the links to snap outwardly to releasably lock the pin lugs to the links.

SUMMARY AND OBJECTS OF THE INVENTION

According to this invention, an improved, corrosion-resistant sprocket chain is provided by a plurality of identical, clevis-type links of synthetic resin composition pivotally connected with one another by means of quickly detachable, twist-locking pivot pins, and wherein each link includes a pair of transversely spaced apart, longitudinally extending side arms connected at one end thereof by an integral, transversely extending yoke or journal having a pin-receiving bore extending therethrough, and terminating at their opposite free ends in a pair of transversely spaced apart, pin-receiving eyes. The eyes of each link are spaced transversely apart a distance slightly greater than the transverse width of the journal of the link to thus permit the eyes of one link to loosely receive therebetween the journal portion of the adjoining link and also permit limited, inward resilient flexure of the eyes of the link toward one another. One of the eyes of the link is formed on its outer side with a pair of circumferentially spaced, cam-type locking surfaces. Each of the pivot pins is formed with a cam follower lug or detent which, upon axial rotation or twisting movement of the pivot pin, is brought into engagement with a cam-type locking surface on the eye of the link to resiliently flex the eyes of the link toward one another until the detent snaps into a notch or dwell formed in the cam surface of the link, thereby locking the pivot pin against accidental removal from the interconnected chain links.

The principal object of the invention is to provide a structurally improved, corrosion-resistant sprocket chain made up of a plurality of identical links and twist-locking pivot pins of molded, synthetic resin composition.

Additional objects and advantages of the invention will become more readily apparent by reference to the following description and the accompanying drawings.

DESCRIPTION OF PREFERRED EMBODIMENT OF THE INVENTION

Figure 4:
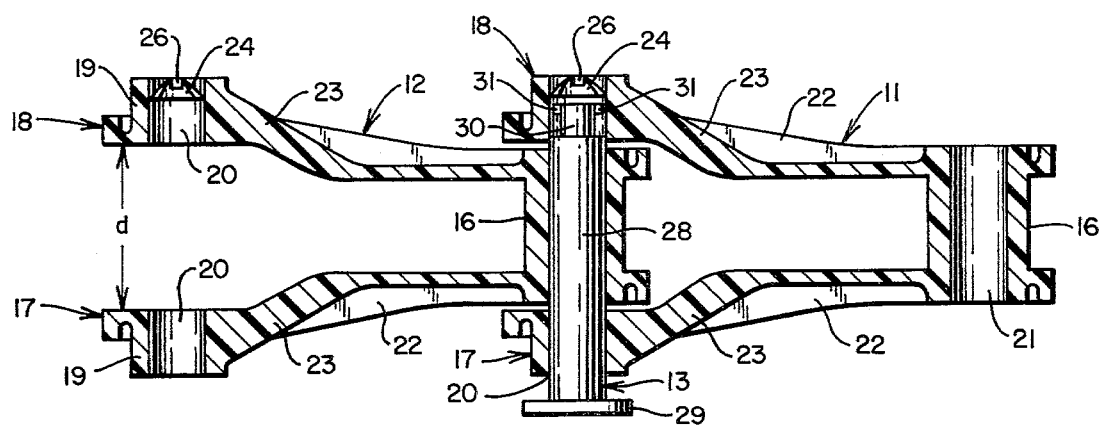
FIG. 4 is a horizontal sectional view taken approximately along the line 4—4 of FIG. 3.

Referring now to the drawings, it will be seen that the present sprocket chain comprises a pair of identical, longitudinally adjoining links 11 and 12 pivotally connected to one another by a quickly detachable, twist-locking pivot pin 13. Each of the links 11 and 12 consists of an integral, bifurcated, generally U-shaped, molded body of synthetic resin composition, e.g. fiber-reinforced and/or filled polyethylene, polypropylene, polystyrene, acrylonitrile-butadiene-styrene (ABS), or polyamide resins. Each link includes a pair of transversely spaced apart side arms 14 and 15 which are connected at one end thereof by a tubular, cylindrical, pin-receiving yoke or bushing 16. The side arms 14 and 15 terminate at their opposite ends in a pair of relatively spaced apart pin-receiving eyes 17 and 18. As will be noted particularly in FIG. 4, the eyes 17 and 18 flair laterally outwardly to either side of the link and are spaced relatively apart from one another a distance, d, which is substantially greater than the transverse width of the bushing or yoke portion 16 of the link. This permits the pin-receiving bushing 16 of one link to fit loosely between the eyes 17 and 18 of an adjoining link, while at the same time providing for limited, inward flexing movement of the eyes of the links toward one another.

Each eye 17 and 18 includes a laterally outwardly extended, tubular cylindrical socket-forming portion 19 having a pin-receiving bore 20 extending therethrough. The yoke portion or bushing 16 of the link is formed with a cylindrical, pin-receiving bore 21 extending axially therethrough. The links 11 and 12 are also preferably formed along their marginal edges with laterally outwardly projecting reinforcing webs or flanges 22 which rigidify and provide laterally outwardly projecting wear surfaces for the links. Additionally, each of the side arms 14 and 15 is formed with an intermediate web 23 which extends from and reinforces the socket portions 19 of the eyes 17 and 18.

Figure 1:
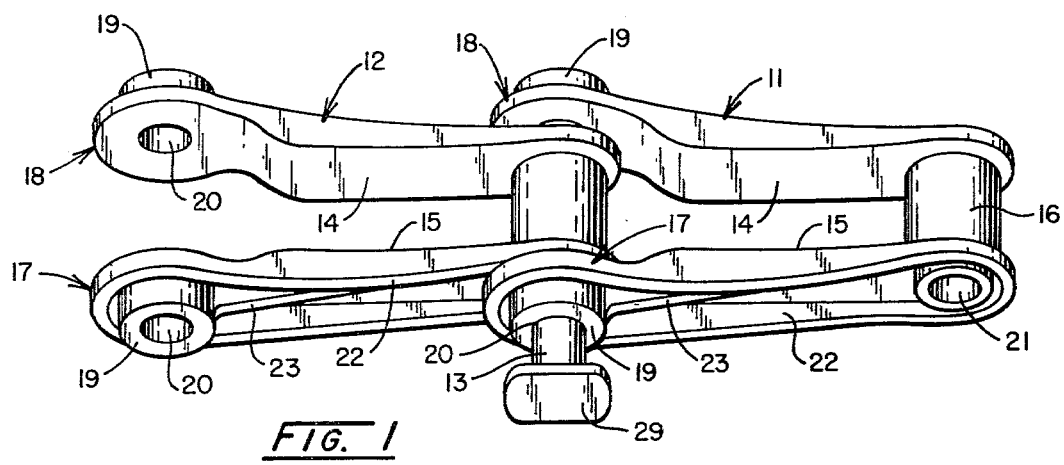
FIG. 1 is a perspective view of a pair of chain links and a twist-locking pivot pin according to this invention with the pivot pin shown in an unlocked condition partially withdrawn from the links.
Figure 2:
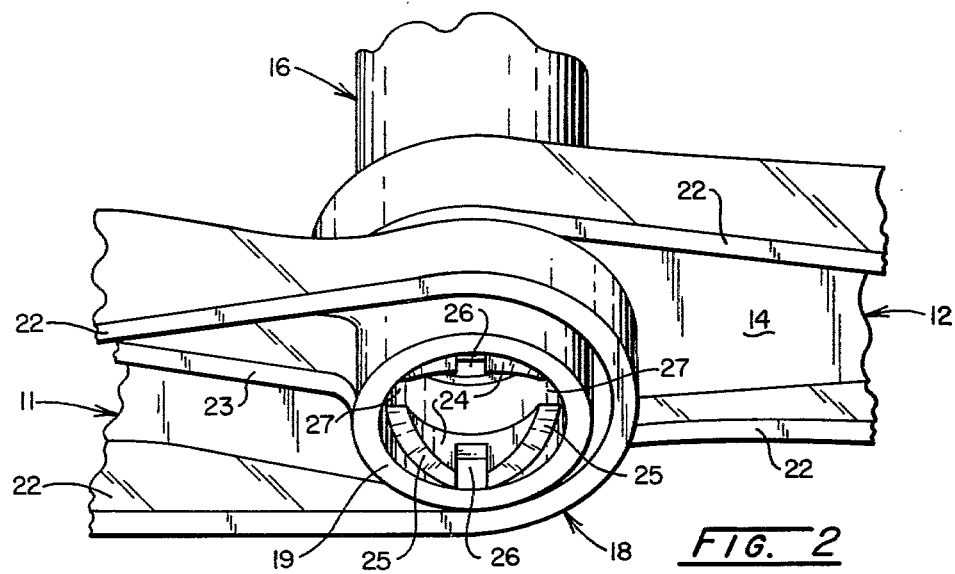
FIG. 2 is an enlarged, fragmentary perspective view showing particularly the pin-locking cam surfaces formed on one of the eyes of the chain links.
Figure 3:
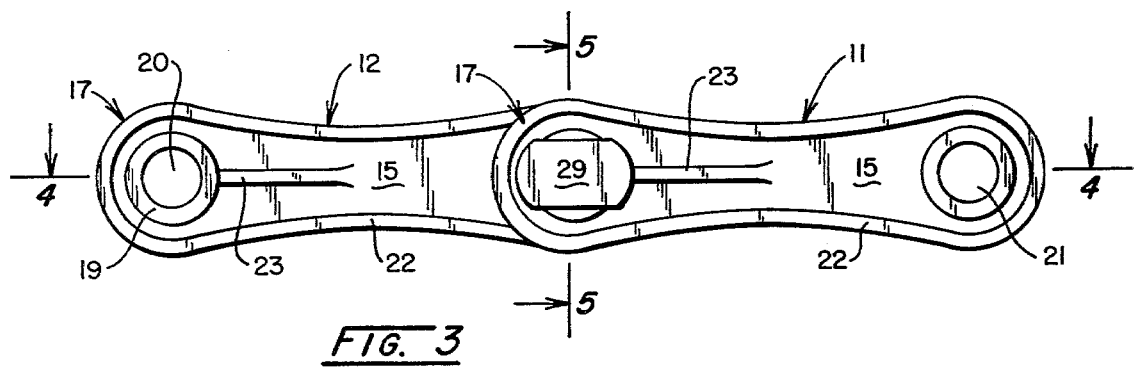
FIG. 3 is a side elevational view of the chain links and pivot pin shown in FIG. 1.

As shown particularly in FIG. 2, the eye portion 18 of each link is provided with a pivot pin-locking means in the form of a pair of circumferentially spaced apart, generally arcuate cams 24 which are integrally molded on the inner wall of the socket portion 19 of the eye 18, adjacent the outer end of the socket. Each of the cams 24 is formed with a pair of axially inclined bearing surfaces 25 which extend helically from the inner wall of the socket portion 19 outwardly toward an intermediate dwell or notch 26 formed in the node portion of each cam 24. The cams 24 are spaced relatively and circumferentially apart at their inner ends to provide a pair of diametrically opposed slots or passages 27 between the cams.

The pivot pin 13 is formed from a suitable synthetic resin, such as a polyamide (Nylon) resin, and is formed with a cylindrical shaft-like body portion 28 which terminates at one end thereof in a radially enlarged, oval-shaped head portion 29. The shaft body 28 of the pin 13 is formed at the opposite end thereof with a relatively reduced diameter terminal end portion 30 which is sized to pass between the inner wall surfaces of the opposed cams 24. The terminal end portion 30 of the pivot pin is also formed with a pair of radially outwardly projecting, cam follower lugs 31 of a width to pass through the slots 27 between the cams 24, as indicated in FIG. 5.

OPERATION

As will be readily understood, a complete sprocket chain may be formed from a multiplicity of pivotally connected links and pivot pins according to this invention. As previously indicated, the individual links are hingedly connected to one another by placing the yoke portion or bushing 16 of a first link between the eyes 17 and 18 of a second, relatively adjoining link, and then passing a pivot pin 13 axially through the opening 20 of the eye 17 of the second link, the bore 21 of the bushing 16 of the first link, and thence through the opening 20 of the opposite eye 18 of the second link. The pivot pin 13 may be easily manipulated by grasping the shaped head 29 of the pin 13 and twisting the pin so that the cam-follower lugs 31 formed on the reduced diameter end portion of the pin will align with and pass through the slots 27 formed between the cams 24 in the eye 18. Once the pivot pin has been fully inserted through the eyes, it may be rotated in either direction approximately 90° to cause the cam follower lugs 31 to engage and move over the inclined bearing surfaces 25 of the cams 24 to a point at which the lugs 31 register with a drop into the intermediate dwells or notches 26 formed in each of the cams 24. During sliding movement of the cam follower lugs 31 over the inclined bearing faces 25 of the cams 24, the opposite eye portions 17 and 18 of the link are resiliently flexed or squeezed inwardly toward one another and toward the side faces of the intervening bushing portion 16 of the adjoining link, and as the lugs 31 come into registry with the notches 26 of the cams, the eye 18 which has been resiliently flexed, snaps outwardly to capture and retain the lugs 31 within the notches 26.

Figure 5:
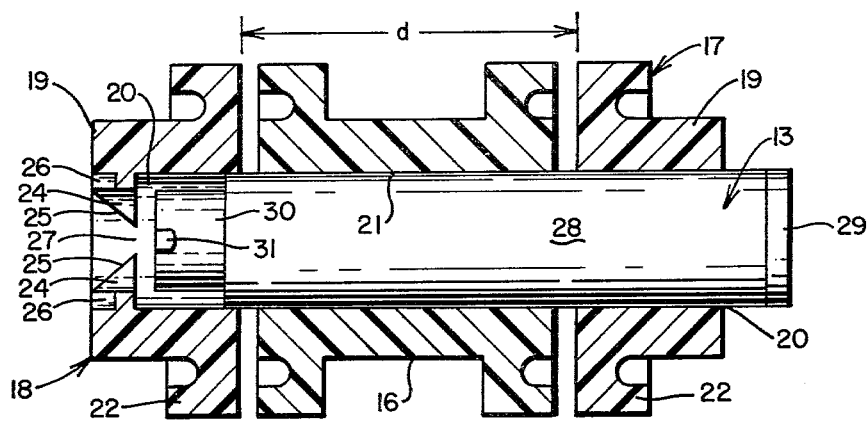
FIG. 5 is a transverse vertical sectional view taken approximately along the line 5—5 of FIG. 3.
Figure 6:
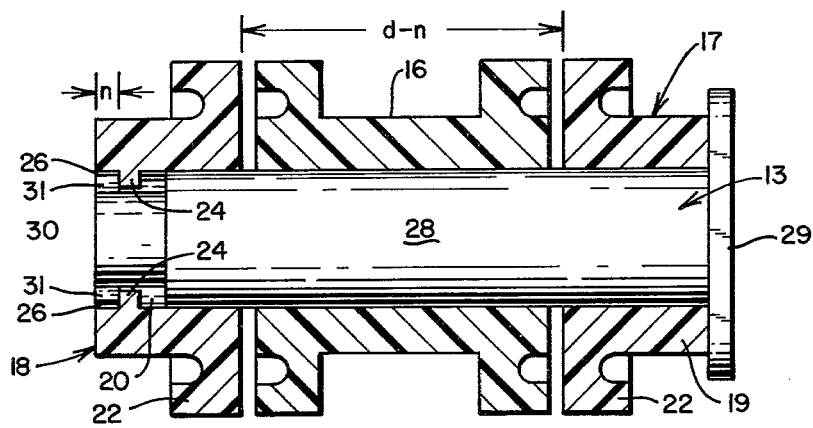
FIG. 6 is a view similar to FIG. 5, but showing the pivot pin in locked position.

As indicated in FIG. 5 of the drawings, the inner side surfaces of the eyes 17 and 18 of the links are normally spaced apart a distance, d, prior to the full insertion and locking of the pivot pin 13. However, when the pivot pin 13 is fully inserted and rotated 90° from the position shown in FIG. 5 to the position shown in FIG. 6, the eyes 17 and 18 are resiliently flexed inwardly toward one another a distance equal to the axial extent of the bearing faces 25 of the cams 24. However, when the cam follower lugs 31 ride over the node portions of the cams 24 and drop into the dwells or notches 26, the eyes 17 and 18 snap slightly apart, but are still maintained under resilient compression since the depth, n, of the notches 26 is less than the axial extent or dimension of the bearing surfaces 25 of the cams. This enables the pivot pins 13 to be locked in tension between the opposite eyes 17 and 18 of the links. When it is desired to disassemble the links, the eyes 17 and 18 must be squeezed toward one another to disengage the lugs 31 from the notches 26 of the cams 24 and permit the pin 13 to be rotated and axially removed from the link eyes and bushing.

As will be understood, the particular synthetic resin or resins from which the links and pivot pins are formed may be selected to provide the desired chemical resistance and mechanical strength properties. However, regardless of the particular species of synthetic resins(s) selected, the present sprocket chain is preferably devoid of metallic components of the type normally susceptible of chemical attack or corrosion.

In view of the foregoing, it will be seen that the present invention provides an improved, "all plastic", sprocket chain made up of adjoining, identical links hingedly connected by means of quick detachable, twist-locking pivot pins all composed of synthetic resin materials.

While a single preferred embodiment of the invention has been illustrated and described in detail, it will be understood that various modifications in details of construction and design are possible without departing from the spirit of the invention or the scope of the following claims.

I claim:

1. A sprocket chain which includes a plurality of identical, longitudinally adjoining links pivotally connected to one another by quickly detachable pivot pins, wherein:

(a) each link comprises an integral, generally elongated, U-shaped body of synthetic resin composition formed with a pair of longitudinally extending side arms terminating at one end thereof in transversely spaced apart, but relatively aligned eye portions and connected at their opposite ends by an integral, tubular cylindrical yoke portion having a pivot pin-receiving bore extending therethrough, said eye portions being normally spaced apart a distance greater than the width of the yoke portion of said links and being resiliently flexible inwardly toward one another, each eye portion having a cylindrical pin-receiving bore extending therethrough and one eye portion of each of said links having an arcuate cam formed with an axially inclined bearing surface extending from the inner wall of its pin receiving bore and including a pin-locking recess; and wherein (b) each of said pivot pins comprises an elongated generally cylindrical body portion of synthetic resin composition formed at one end thereof with a radially enlarged head and at its opposite end with a diametrically reduced, cylindrical terminal having a cam follower locking lug projecting radially outwardly therefrom, but terminating radially inwardly with respect to the cylindrical outer surface of the body portion of the pin, the cylindrical body portion of each pin being sized to closely but rotatively pass through the bores of the eye portions of one link and the bore of the yoke portion of an adjoining link to pivotally join said links, and the cam follower locking lug of each pin being disposed, upon full insertion and axial rotation of the pin in the eye portions of a link, to initially engage with the cam bearing surface of said link and to resiliently flex the eye portions of the link toward one another before reaching the pin-locking recess of said cam bearing surface, said cam follower locking lug, upon reaching said recess, permitting the eye portion of said link to resiliently snap outwardly to a position in which said locking lug is retained in said recess.

2. A sprocket chain according to claim 1, wherein the side arms of each link are formed along the marginal edges thereof with laterally outwardly projecting reinforcing webs.

* * * * *